United States Patent Office 3,475,360
Patented Oct. 28, 1969

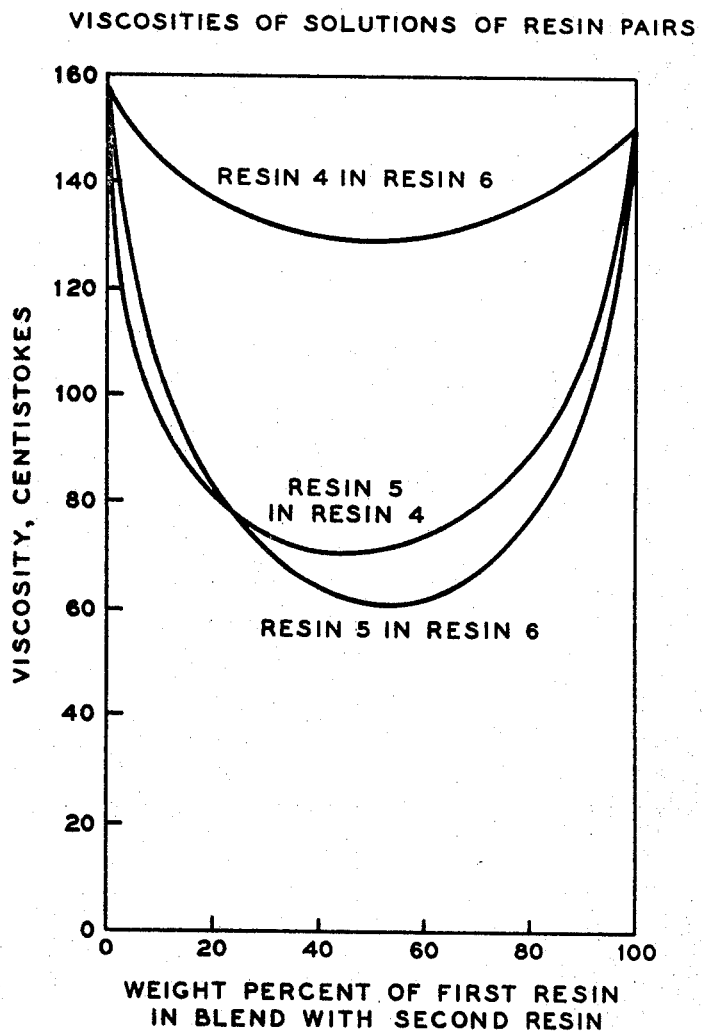
VISCOSITIES OF SOLUTIONS OF RESIN PAIRS

3,475,360
THIXOTROPIC, NON-SAG, ONE-COAT PAINTS CONTAINING BINARY MIXTURES OF OIL MODIFIED ALKYDS HAVING DIFFERENT OIL LENGTHS
William H. Ellis, El Segundo, and Earl F. Carlston, El Cerrito, Calif., assignors to Chevron Research Company, a corporation of Delaware
Filed July 1, 1966, Ser. No. 562,304
Int. Cl. C09d 5/08, 3/64
U.S. Cl. 260—22       8 Claims

ABSTRACT OF THE DISCLOSURE

Oil-based paints having as non-volatile vehicles, binary mixtures of oil modified alkyd resins having different oil lengths, the interaction between the resins imparting non-sag and thixotropic properties to the paints.

---

The present invention relates to one-coat, non-sag, thixotropic, paints and as bases for the paints, non-volatile vehicles which are binary mixtures of certain oil-modified alkyd resins or mixtures of the resins and drying oils. The vehicles are especially useful in preparing high-gloss enamels.

In the paint art, it has been found highly advantageous to employ one-coat paints. It is obvious from the point of economy that the use of a paint which will provide adequate coverage of surfaces with one coat will reflect substantial savings in labor and materials over the use of ordinary paints, which often require two or more applications. One-coat paints are defined in the art as those that have sufficient hiding power to cover any color of surface in one application by brush, roller or spray. In the case of enamels, the problem of providing one-coat materials is aggravated because in order to obtain desired gloss, enamels are usually formulated with a low pigment content. Thus, the addition of more pigment to provide a greater hiding power and make enamels suitable for one-coat application results in loss of the desired gloss. Moreover, addition of pigment to increase hiding power is only effective to a certain degree. For example, in the case of white enamels using titanium oxide as the hiding pigment, 25 to 30% of pigment volume concentration produces maximum hiding, further addition results only in a decrease in hiding power and a great increase in viscosity.

A second approach that is often taken in order to increase hiding power is to apply the paint to the surface in a thicker film. In order to accomplish this, a means of applying a proper flow must be used. In any event, and most especially in brushing or rolling application, serious problems of proper flow and brushability of the paints arise. Thus, if the solids content of the paint is increased in order to achieve a thicker film, the viscosity of the paint is increased and brushing is made much more difficult. A common practice which is used in order to overcome these difficulties is the use of a thixotropic paint vehicle. A thixotropic paint will flow easily when rolling pressure is applied, but will assume a gel structure when the pressure is removed, allowing greater coat thicknesses. Means which have been used to impart thixotropic character to paints have been the use of certain additives and the use of thixotropic alkyd resins as a vehicle. Among the materials which have been used to modify the flow properties of paint are water; bodied oils, which are bodied just short of gelation, and act to raise the average vehicle viscosity; metallic soaps; certain acidic materials which form in situ soaps with basic pigments; silica pigments, which provide the effect of a flocculated structure; and colloidal-type additives, which swell in the vehicles to yield a colloidal structure with thixotropic properties. The obvious advantage of a thixotropic paint is that it will have a low viscosity under the shearing action of a brush and a high viscosity at rest. This effect results in a highly desirable combination of properties, particularly if the recovery from low to high viscosity is relatively slow and the paint contains a solvent of low volatility. Under these conditions, the bulk consistency of the paint will be high enough to prevent dripping and splattering, but the paint will flow and spread easily under the shearing action of the brush. The return to high viscosity with removal of the brush shear prevents sagging and enhances the hiding power by permitting the application of a thick film.

It has now been found that paints possessing excellent brushability, hiding power, sag resistance, and high gloss retention may be compounded employing as a non-volatile vehicle, a binary mixture of alkyd resins, the mixture comprising a combination of (A) a modified alkyd resin having an oil content between about 55 and 70 weight percent, and (B) a second alkyd resin having an oil content of from 80 to 90 weight percent.

The preferred resins are the oil-modified glyceryl phthalate resins. These materials are polymeric polyesters of polyhydric alcohols having more than two hydroxyl groups, e.g., glycerol and the resinifying polycarboxylic acids which are phthalic acids and terephthalic acid. A portion of the polycarboxylic acid is replaced by a fatty acid from vegetable or marine oils to produce an oil-modified alkyd resin. Resins may be made with drying, semi-drying or non-drying oils. However, the drying and semi-drying oils are preferred for the paints and vehicles of this invention. Oils which are commonly employed in the modification of the resins include the drying oils such as linseed and dehydrated castor oil, and the semi-drying oils such as soybean oil, etc. The modification may be made by employing selected fatty acids in the manufacture, rather than using the oil itself. The preparation of these modified resins is well known in the art, there being numerous patents and other publications directed to the subject, and since the preparation comprises no part of this invention, it will not be further elaborated. However, it may be noted that suitable alkyds include those which contain a wide variety of polyhydric alcohols, i.e., those other than glycerol. For example, pentaerythritol is often used to replace part of the glycerol and to produce further modified characteristics in the resins. Thus, included among the polyfunctional alcohols which may be employed are glycol, diethylene glycol, triethylene glycol, propylene glycol, dipentaerythritol, sorbitol, mannitol, etc.

The non-volatile vehicles of the invention are prepared by simply mixing together the appropriate quantities of the desired resins and oil. The paints are prepared conventionally, with the provision that the resins, etc., must be mixed together either prior to or concurrently with the addition of the other paint constituents, e.g., pigment, anti-skinning agents, drier, etc. Thus, it is not suitable for the pigment, etc. to be added to each resin component and then the material mixed together. This procedure will not produce the desired thixotropic properties.

The proper portions of the resin components (A) and (B) are from 5 to 30 percent of (A) and, reciprocably, from 70 to 95 percent by weight of (B). As will be shown, these proportions produce a vehicle that imparts to the paint in which the vehicle is employed, surprisingly high sag resistance combined with excellent brushability of the paint.

In order to determine the properties of the vehicles in paints which were prepared, the following determinations were employed:

Viscosity of resin solutions (vehicles)

The viscosity of resin solutions was determined with the Zeitfuchs cross-arm viscometer. The determination was made according to ASTM Method D-445-Test for Kenematic Viscosity, Appendix F. The readings are given directly in centistokes, which can be converted to centipoises by multiplying by the density.

Paint viscosity, Krebs units

The Krebs-Stormer viscosity is the most commonly used scale for comparing the viscosities of brushing enamels. The Krebs-Stormer viscosimeter employs a two-bladed paddle immersed in the paint. Weights attached to the paddle through a pulley system cause the paddle to rotate. The weight required to rotate the paddle at 200 r.p.m. is proportional to the viscosity in Krebs Units (KU).

Brushability

Brushability in the art is the ease with which the brush can be moved across to the surface while the paint is being applied. It is thus a measure of the high shear viscosity of the paint, and this figure must be low for good brushability. In this work the brushability was measured with a Brushometer, which is a viscosimeter operating at a high shear rate of about 20,000 sec.-1.

The instrument and methods of operation have been described by Patton (Thomas C. Patton), "A Modern Approach to the Measurement and Evaluation of Brushability," Official Digest of the Federation of Societies for Paint Technology 36-745 (1964). In the test the head of the instrument is immersed in the paint. The paint is sheared in the annular space between a rotating shaft and a suspended cylinder, the torque transmitted from the shaft through the paint to the cylinder is read from a dial and is proportional to the viscosity in poises.

Sag resistance

Sagging is the downward flow of paint that results in an uneven film thickness. It appears most often as "curtains" or "tears" on the painted surface. A painter will most always adjust the amount of paint he is applying to avoid sagging, thus a paint with low sag resistance will usually hide poorly. Sag resistance depends primarily on the low-shear viscosity of the paint during the initial stages of drying. Either the initial viscosity should be high, or it should rise rapidly during the first few minutes after application.

Sag resistance is measured by applying a series of stripes of varying film thickness to a glass plate, placing the plate in a vertical position with the stripes horizontal, and measuring the percent increase in width of the strips after the paint has dried. This procedure is described in an article by D. J. Rassmussen and W. H. Ellis, "The Measurement and Control of Paint Sagging," Official Digest Digest of the Federation of Societies for Paint Technology, 34-1104 (1962). Results are reported as the film thickness at 50% or 100% increase in stripe width. Originally, the stripes are ¼-inch in width and ¼-inch apart. The stripes are laid down with a metal blade, leaving a wet film having a thickness of about one-half the clearance of the blade, and the results are easily reported in terms of blade clearance rather than actual wet film thickness. The scale runs from a poor rating of 2 to an excellent rating of 18.

Leveling

Leveling is the ability of a paint to form a smooth film after application and to eliminate brush marks and other surface irregularities. It depends primarily upon surface tension and viscosity of the paint during initial stages of drying. A low viscosity paint under low-shear conditions will have good leveling. Leveling is evaluated by the method of the New York Paint Society. Reference to the method may be found in New York Society for Paint Technology, "The Evaluation of Leveling by a Draw-Down Method," Official Digest of the Federation of Societies for Paint Technology, 32-1435 (1960). According to the method, pairs of stripes of 5 different film thicknesses are applied to a glass plate in a manner similar to that used to evaluate sag resistance. The flowing together of the duplicate paint stripes is a measure of leveling when the panels are allowed to dry in a horizontal position. The paints are rated on a scale where 0 is poor and 10 is excellent.

Gloss

Gloss is the ability of a dried paint film to reflect light and to reflect images distinctly. The desired gloss will vary with the end use of the product, and its level depends mostly upon the inherent nature of the resin, the type and amount of pigmentation. For the highest gloss, however, lowest viscosity is required because the paint must flow sufficiently to cover all pigment particles and form a smooth surface. Gloss is measured by means of the Gardner Gloss Meter, which is a photoelectric device that measures the percent of incandescent light reflected by the paint surface.

In order to demonstrate the outstanding characteristics of the paints of this invention, paints were prepared using a two-resin system and a comparable three-resin system of this invention. Table I below gives the compositions and properties of the resins employed. Alkyd resins and oils were prepared, employing the constituents in Table I, as follows.

TABLE I.—RESIN PROPERTIES

| Properties | Resin 1 | Resin 2 | Resin 3 | Resin 4 | Resin 5 | Resin 6 | Resin 7 |
| --- | --- | --- | --- | --- | --- | --- | --- |
| Oil Type | Tall oil fatty acids. | Tall oil fatty acids. | Tall oil fatty acids. | Safflower | Soya-safflower. | Soya-safflower. | Tall oil fatty acids. |
| Dibasic Acid Type | Isophthalic | Isophthalic | Isophthalic | Isophthalic | Phthalic | Isophthalic | Isophthalic. |
| Polyol Type | Pentaerythritol-glycerol. | Pentaerythritol-glycerol. | Pentaerythritol. | Glycerol | Pentaerythritol-glycerol. | Pentaerythritol-glycerol. | Pentaerythritol-glycerol. |
| Phthalic Content, Wt. percent | 23 | 21 | 14 | 22 | 25 | 9 | 23. |
| Oil Content, Wt. percent | 67 | 71 | 82 | 70 | 61 | 85 | 66. |

Paints were prepared employing the resin vehicles of Table I. These resin combinations were blended together before addition of pigment and other additives. The composition of a typical paint is listed in Table II.

TABLE II.—PAINT FORMULAS (100-gallon batches)

| | Paint A (pounds) |
| --- | --- |
| Resin 6 (85% oil length) | 262.0 |
| Resin 5 (61% oil length) | 44.0 |
| $TiO_2$-rutile pigment | 357.0 |
| $CaCO_3$ pigment | 112.0 |
| Zinc oxide | 12.5 |
| Aluminum stearate | 4.0 |
| Lecithin | 2.5 |
| Drier | 6.5 |
| Anti-skinning agent | 2.5 |
| Odorless thinner | 207.0 |
| | 1,010.0 |

Vehicle solids _____ percent__ 59.6

PVC=($TiO_2$=20, $CaCO_3$=10)

Vehicle viscosity=100 centistokes

The brushability and sag resistant characteristics of the paints prepared, as well as the viscosity characteristics of the resin pairs, were determined. It was found that at concentrations of from about 5 to 30% by weight of the lower oil content resin in the higher, the sag resistance reaches a maximum; the Brushometer viscosity remains low, giving excellent brushing characteristics.

Thus, the maximum in sag resistance combined with good brushability is obtained with a first resin having an oil content of about 90% and a resin (Resin 1) having an oil content of about 55%, a point at which insolubility is approached. The appended figure shows the viscosities caused by the interaction of three resin pairs. The table is read as weight percent of the first resin in a blend with the second resin. It will be noted that the maximum effect in this case is obtained with resin 5 in resin 6, the minimum with resin 4 in resin 6. The minimum difference in oil content of the two resins thus must be at least 8 percentage points in order to obtain the desired thixotropic properties of this invention. Further, it is necessary that the lower oil content resin have an oil content lower than about 68% by weight and preferably not more than 66% by weight. For example, a blend of a 71% oil content resin (resin 2) with an 82% oil content resin (resin 3) gave substantial linearity in viscosity over various combinations, while the combination of a 67% oil content resin (resin 1) with an 82% oil content resin gave a substantial thixotropic effect, and combinations with a 66% oil content resin (resin 7) with the 82% oil content resin gave a substantially greater effect. The higher oil content resin should not have an oil content greater than about 90%.

The paints of this invention are prepared in the same manner as any oil-based paint; the techniques for preparation are well known in the art and will not be elaborated upon here.

While the preferred paints of this invention are gloss enamels, since the non-sag characteristics and gloss retention imparted by the vehicles are most important for these paints, the need for one-coat materials makes these vehicle combinations suitable for many other types of paint, such as flat enamels, outdoor housepaints of various types, and, in fact, any type of oil-based paint.

In addition to the pigments employed, other normally used paint additives are often employed in the paints of the invention, such as drying agents, extenders, corrosion inhibitors, etc.

We claim:

1. An oil-based, thixotropic paint having as a non-volatile vehicle, a mixture of from 5 to 30% by weight of (A) a modified alkyd resin having an oil content of 55 to 67 weight percent, and from 70 to 95 percent by weight of (B) a second modified alkyd resin having an oil content of from 70 to 90 weight percent, wherein there is a difference of oil content between (A) and (B) of at least 8 weight percent, and wherein (A) and (B) are polyhydric alcohol phthalate resins modified by fatty acids from drying oils or semi-drying oils.

2. The paint of claim 1, wherein (A) is present in the amount of from about 10 to 25 weight percent.

3. The paint of claim 2 wherein the difference in oil content between (A) and (B) is at least 20 weight percent.

4. The paint of claim 1 wherein (A) is a resin having an oil content of from about 57 to 66 weight percent and (B) is a resin with an oil content of about 85 weight percent.

5. The paint of claim 1 in which (A) and (B) are glyceryl phthalate.

6. The paint of claim 1 in which (A) and (B) are pentaerythritol modified glyceryl phthalate resins.

7. A thixotropic, non-volatile paint vehicle comprising a mixture as defined in claim 1.

8. A paint vehicle comprising a mixture as defined in claim 2.

References Cited

UNITED STATES PATENTS

| | | | |
|---|---|---|---|
| 2,232,426 | 2/1941 | Barrett | 260—22 |
| 2,279,496 | 4/1942 | Sackett | 260—22 |
| 2,287,986 | 6/1942 | Gowing et al. | 260—22 |
| 2,889,293 | 6/1959 | Hensley et al. | 260—22 |
| 3,077,459 | 2/1963 | Hershey et al. | 260—22 |

OTHER REFERENCES

Rinse, Paint Technology, November 1946, vol. XI, No. 131, pages 429 and 430.

"Trimellitic Anhydride," published 1958 by Amoco Chemicals Corp., pages 10–23.

DONALD E. CZAJA, Primary Examiner

R. W. GRIFFIN, Assistant Examiner

U.S. Cl. X.R.

117—161, 167; 260—32.4, 40